Aug. 6, 1946.   W. H. J. BROCK   2,405,489
COUPLING DEVICE FOR PIPES OR TUBES
Filed Sept. 27, 1943

INVENTOR
William Hudson James Brock
BY Stevens and Davis
ATTORNEYS

Patented Aug. 6, 1946

2,405,489

UNITED STATES PATENT OFFICE 2,405,489

COUPLING DEVICE FOR PIPES OR TUBES

William Hudson James Brock, Leamington Spa, England, assignor of one-half to Automotive Products Company, Limited, Leamington Spa, England Application September 27, 1943, Serial No. 504,008
In Great Britain November 30, 1942

4 Claims. (Cl. 285—122)

This invention relates to coupling devices for pipes or tubes, of the kind in which the end of a pipe or tube is gripped by a gripping member positioned between the part to which the pipe is coupled and an annular cap, tube nut or equivalent adapted to be drawn towards the said part and held in relation thereto by screw threaded or equivalent means. The device, according to the invention, will be hereinafter referred to as a tube coupling, but it is to be understood that it may be employed for coupling any form of substantially rigid pipes, tubes or tubular members.

The object of the invention is to provide an improved coupling device of the kind referred to.

According to the invention, in a tube coupling device of the kind referred to, the gripping member comprises a substantially rigid annular part adapted to surround the tube and an annular deformable part at at least one end of the said rigid part, the deformable part being adapted to be deformed by axial pressure to reduce its internal diameter and cause it to enter, or form and enter, a circumferential groove in the surface of the tube.

According to one aspect of the invention, the gripping member comprises a collar adapted to surround the tube and to be fixed thereon by the flattening of a lip initially of conical form projecting from one end face of the collar and converging towards its free end which defines an aperture of a size to pass freely over the tube, the flattening of the lip reducing its inner diameter so that its edge enters, or forms and enters, a circumferential groove in the surface of the tube.

According to another aspect of the invention the gripping member comprises a collar surrounding the tube and clamped rigidly between the part or body portions to which the tube is attached and the annular cap clamping member or equivalent, the collar having at one end an annular lip initially of conical form and converging from the face of the collar to define at its smaller end an aperture through which the tube is able to pass, and the said lip being flattened when the annular cap or equivalent is screwed up so that its inner edge is reduced in diameter and enters, or forms and enters, a circumferential groove in the surface of the tube.

In one form of coupling device according to the invention the gripping member comprises a collar surrounding the tube, the collar, which has one end face coned, and has at its other end a convergent conical lip projecting from that end face to define at its smaller end an aperture through which the tube is able to pass, being positioned on the tube with the lip adjacent the part to which the tube is attached and being clamped between the said part and the annular cap or equivalent and compressed axially to flatten the lip and reduce the diameter of its inner edge so that it enters, or forms and enters, a circumferential groove in the tube surface, the annular cap or equivalent engaging the coned end face of the collar about a narrow annular region adjacent to, but not at, its smaller end.

The lip may be integral with the collar, or may comprise a coned washer separate from the collar and located in an annular recess in the end face of the latter, the circumferential wall of which recess may be undercut whilst the outer edge of the washer is so formed as to enter the said undercut when the washer is flattened.

The face of the part to which the tube is attached which engages the lip of the gripping member may have an external diameter not greater than the diameter of the larger end of the lip.

The invention is hereinafter described with reference to the accompanying drawing, in which.

Figure 1:
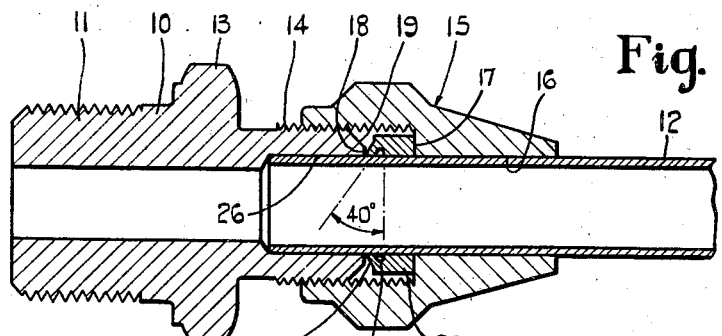
Figure 1 is a longitudinal section through one form of tube coupling device according to the invention, with the parts assembled, but before the lip of the gripping member has been deformed.
Figure 2:
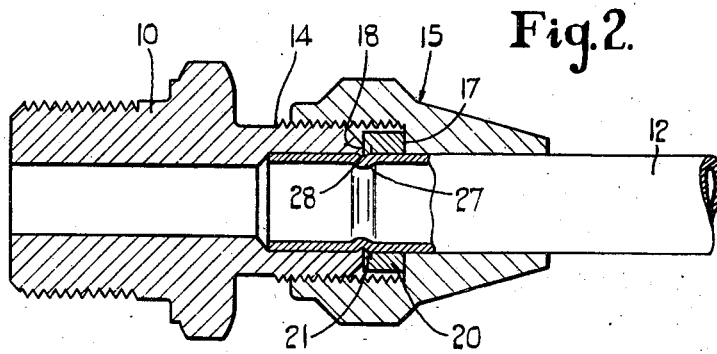
Figure 2 is a similar section of the coupling device after deformation of the lip.

Referring to Figures 1 and 2, the body portion 10 is an adaptor threaded externally at 11 for attachment to any required member such as a liquid reservoir, pump, motor unit or the like of a liquid pressure remote control system, a fuel tank, or any other unit to which piping has to be connected, and 12 is the tube to be connected thereto. The body portion or adaptor 10 has a central hexagonal portion 13 to receive a spanner, and a second externally threaded portion 14 to receive a tube nut or other annular clamping member 15. The internally threaded portion of the tube nut which mates with the screwed portion 14 of the adaptor is larger than the remainder of the bore of the latter, which, at 16, is an easy sliding fit on the tube 12, the two portions of the bore being connected by a shoulder 17 perpendicular to the axis of the tube nut. The end of the adaptor which enters the tube nut has a central portion 18 which is perpendicular to the axis of the adaptor, and is chamfered as at 19 over the remainder of its surface. The gripping member is assembled between the end of the adaptor and the shoulder 17 of the tube nut, and comprises a substantially rectangular collar 20 which is a sliding fit on the tube 12, and a lip 21 the outer surface of which is formed by a frustum of a cone merging into one end face of the collar at a distance from the outer edge of the latter equal to about one third of the radial thickness of the collar. The inner surface of the lip is parallel to its outer surface, and the space 22 behind it is substantially V-shaped, the surface of the said space opposite to the lip being perpendicular to the axis of the collar. The free edge of the lip 21 defines an aperture of the same diameter as the inside of the collar, the said aperture being of uniform diameter throughout the thickness of the lip.

Figure 3:
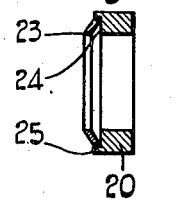
Figure 3 is a section through a gripping member having a separate lip.

The lip may be integral with the collar as shown in Figures 1 and 2, or may be formed by a separate coned washer 23, as shown in Figure 3, the collar 20 being formed with a recess 24 in its end to receive the washer 23, and the circumferential wall of the recess being undercut as at 25 to receive the outer edge of the washer when the latter is flattened, and prevent the washer from leaving the recess.

The screwed portion 14 of the body portion or adaptor 10 is counterbored at 26 to receive the tube end. To assemble a fitting of the kind shown in Figures 1 and 2 the tube nut is first slipped on to the tube end, followed by the collar 20, the lip of the latter projecting towards the end of the tube to be coupled, and the tube is inserted in the counterbored end of the adaptor 10. It may be noted that the extent to which the tube enters the adaptor is unimportant, and that the tube end need not be finished perpendicular to the axis with any degree of accuracy. The tube nut is then screwed on to the thread 14 of the body portion or adaptor, with the result that the gripping member is subjected to axial compression between the shoulder 17 and surface 18. The axial pressure flattens the lip 21 against the opposite face of the recess 22, and, in so doing, causes the inner edge of the lip to move inwardly, with the result that it deforms the tube inwardly as at 27 in Figure 2, and forms for itself a circumferential groove 28 which it enters. The edge of the lip, being in engagement with the face 18 of the adaptor, does not move along the tube during its deformation, but simply moves inwardly without changing its axial position. There is thus no scraping action, and the edge of the lip fits tightly in the groove it has formed. The surface 18, being only wide enough to engage the lip 21, and not the solid part of the collar which surrounds it, is able to force the lip firmly back against the body of the collar even if, to do so, the outer face of the lip has to be forced beyond the plane of the end of the collar. To force the tube out of the end fitting after assembly, it would be necessary to deform the lip back to its original conical shape, and any pressure acting in the tube, which tends to pull the tube out of the fitting, merely forces the lip more firmly against the face of the collar 20, so that the fitting obviously has a very high resistance to pulling out.

Figure 4:
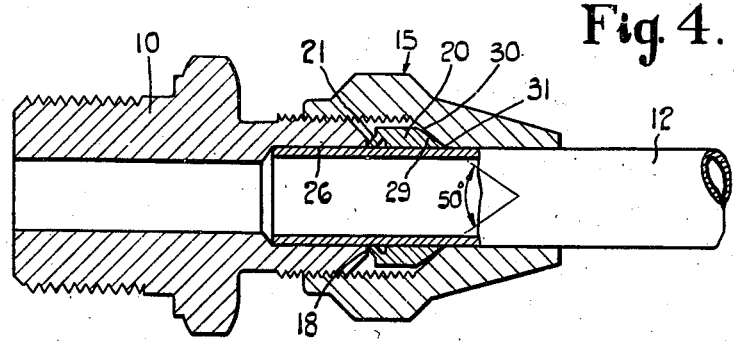
Figures 4 and 5 are views similar to Figures 1 and 2 of a tube coupling device incorporating a modified gripping member.
Figure 5:
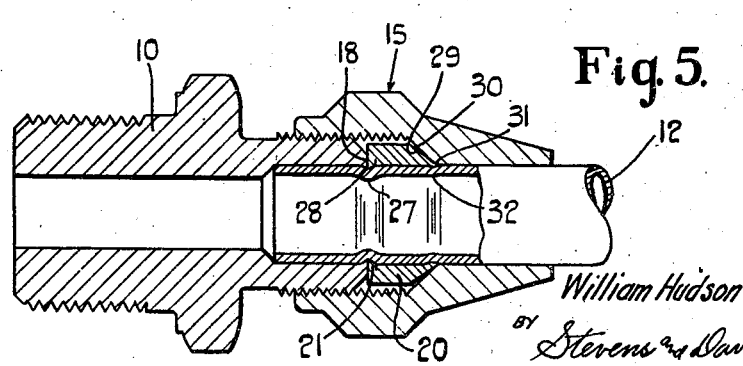

Figures 4 and 5 show a coupling device similar to that shown in Figures 1 and 2, but with the end of the collar 29 of the gripping member remote from the lip 21, tapered instead of being perpendicular to the axis of the collar. The cone angle of this tapered end 29 is not less than 50°, so that the thickness of the collar near its edge is sufficient to resist any substantial inward deformation. The shoulder of the tube nut is also of conical form, as at 30, the angle of the cone of which it is a frustum being slightly greater than the angle of the part 29. The surface 30 merges into the bore 16 of the tube nut in a radius 31 such that the actual line of contact between the tube nut and the part 29 is slightly spaced from the edge of that surface. In this form of coupling device, when the tube nut is screwed up, the lip 21 is flattened as in the previous example, and the free end of the conical part 29 is slightly compressed radially to cause it to grip the tube firmly, with perhaps a very slight deformation of the tube as at 32 in Figure 5, to provide an additional seal against leakage of fluid between the tube and collar when there is pressure in the tube. The angle of the coned end of the collar is such that its thickness increases relatively quickly from the tapered edge towards the parallel part, with the result that, using normal tools, no substantial deformation of the conical part 29 can be produced, and there is no risk of causing collapse of the tube. The lip 21 of the gripping member may be replaced by a separate washer 23, as shown in Figure 3.

Instead of being compressed against a metal face of the collar 20, the lip 21 or washer 23 may, in either of the examples above described, be compressed against the face of a ring of rubber, fibre or other relatively soft material mounted in a recess in the collar, the pressure exerted by the lip deforming the said ring to cause it to press tightly against the tube and assist in providing a fluid-tight joint. Alternatively, the V-shaped space behind the lip may be filled with a plastic material preferably having self-hardening properties, the material being squeezed out of the space when the lip is flattened, to form a layer between the collar and the tube. An uncured or partially cured rubber mix which will complete its curing without the application of heat or pressure is preferably used as the sealing material.

The angle of the lip to the end face of the collar is selected according to the depth to which it is desired that the edge of the lip shall enter the tube. It has been found that, with a mild steel clamping unit used on copper tubing, an appropriate angle is 40°. The lip being supported by the collar with which it is integral or by which it is confined at its outer periphery, is unable to expand radially during flattening, and can deform only in an inward direction. This not only ensures the maximum possible depth of interengagement of the clamping element and tube for a given initial angle of the lip, but also prevents the lip from expanding outwardly and becoming locked in the tube nut, wtih resulting difficulties in subsequent removal. The angle of the coned end 29 of the collar may also be varied to suit the materials and conditions of any particular application, but the angle given above, namely 50°, is believed to be the minimum angle which ensures that the said end will not collapse under the loads which may be applied during coupling.

A gripping member may be provided with a lip 21 or washer 23 at both ends. One or both of the two lips will, of course, move along the tube as it is flattened, and will not merely move inwardly at a fixed point on the tube, but an undeformed portion of the tube will remain between the two lips and will be held firmly between them. The gripping member, or, in the case of the lip being formed as a separate washer, at least the said washer, is normally of a material harder than the tube with which it is used, so that it will readily deform the said tube and produce the necessary groove therein, but this is not essential if the tube is of such thin section that the lip is able to deform the wall bodily inwardly. With thicker tubing, the lip may have to cut its way into the tubing without displacing the wall bodily inwardly and the lip must then be harder than the tube. Alternatively, a groove may be preformed in the tube to receive the edge of the lip. The lip may be hardened by heat treatment if the collar is made of a suitable metal. The dimensions of the groove may be such that the lip, after entering it, is itself somewhat deformed to ensure a tight fit and adequate sealing against leakage of fluid.

What I claim is:

1. In a tube coupling device including a body portion to which the tube is to be attached and an annular clamping member, a gripping collar adapted to overlie the tube and to be clamped axially between said body portion and said clamping member, said gripping collar having an internal annular recess defined between an initially frusto conical annular lip and an annular surface lying substantially in a plane normal to the axis of the collar, an annular surface of said body portion lying substantially parallel to the annular surface of said collar in position to be engaged by said lip, and means for forcing said clamping member toward said body portion to flatten said lip of said collar between said annular surfaces normal to the axis of the collar to cause the lip to bite into the tube.

2. A tube coupling device as claimed in claim 1 wherein said gripping collar is provided with a frusto conical surface at its end remote from the lip and wherein said annular clamping member includes a narrow annular region for engaging said frusto conical surface adjacent its point of minimum diameter.

3. A tube coupling device as claimed in claim 1 wherein the gripping collar is provided with an annular groove and a coned washer is mounted with its outer edge therein, said washer constituting the lip and defining with said annular surface lying in a plane normal to the axis of the collar said internal annular recess.

4. A tube coupling device as claimed in claim 1 wherein said gripping collar is provided with a frusto conical surface at its end remote from the lip and wherein said annular clamping member includes a complementary frusto conical surface for engaging the frusto conical surface of the gripping collar, the apical angle of the conical surface of the clamping member being greater than that of the gripping collar.

WILLIAM HUDSON JAMES BROCK.